United States Patent
Goergen et al.

(10) Patent No.: US 12,505,522 B2
(45) Date of Patent: Dec. 23, 2025

(54) IMAGE CORRECTION SYSTEM AND METHOD

(71) Applicant: Universal City Studios LLC, Universal City, CA (US)

(72) Inventors: Patrick John Goergen, Orlando, FL (US); Robert Michael Jordan, Orlando, FL (US)

(73) Assignee: Universal City Studios LLC, Universal City, CA (US)

( * ) Notice: Subject to any disclaimer, the term of this patent is extended or adjusted under 35 U.S.C. 154(b) by 0 days.

(21) Appl. No.: 18/883,601

(22) Filed: Sep. 12, 2024

(65) Prior Publication Data

US 2025/0095123 A1  Mar. 20, 2025

Related U.S. Application Data

(60) Provisional application No. 63/538,980, filed on Sep. 18, 2023.

(51) Int. Cl.

| | |
|---|---|
| *G06T 5/80* | (2024.01) |
| *A63G 31/16* | (2006.01) |
| *G06F 3/01* | (2006.01) |
| *G06F 3/14* | (2006.01) |
| *G06T 7/20* | (2017.01) |

(52) U.S. Cl.
CPC ............ *G06T 5/80* (2024.01); *G06F 3/012* (2013.01); *G06F 3/14* (2013.01); *G06T 7/20* (2013.01); *A63G 31/16* (2013.01); *G06T 2207/30196* (2013.01)

(58) Field of Classification Search
CPC ... G06T 5/80; G06T 7/20; G06T 2207/30196; G06F 3/012; G06F 3/14; A63G 31/16
See application file for complete search history.

(56) References Cited

U.S. PATENT DOCUMENTS

| | | |
|---|---|---|
| 8,740,702 B2 | 6/2014 | Langridge et al. |
| 9,142,062 B2 | 9/2015 | Maciocci et al. |
| 9,839,857 B2 | 12/2017 | Wagner |

(Continued)

OTHER PUBLICATIONS

PCT/US2024/046971 International Search Report and Written Opinion mailed Dec. 11, 2024.

(Continued)

*Primary Examiner* — Kenneth B Lee, Jr.
(74) *Attorney, Agent, or Firm* — Fletcher Yoder P.C.

(57) ABSTRACT

An image correction system may include a head-mounted display, a server, and a local correction device. The head-mounted display includes a display configured to display one or more corrected images and one or more sensors configured to generate initial tracking information and updated tracking information, wherein the initial tracking information is associated with a first time point and the updated tracking information is associated with a second time point subsequent to the first time point. The local correction device is configured to: receive the tracking information from the head-mounted display, transmit the initial tracking information to a server, receive one or more rendered images from the server, generate the one or more corrected images based on the one or more rendered images and the updated tracking information, and transmit the one or more corrected images to the head-mounted display.

18 Claims, 8 Drawing Sheets

(56) References Cited

U.S. PATENT DOCUMENTS

| | | |
|---|---|---|
| 10,600,248 B2 | 3/2020 | Holz |
| 10,705,598 B2 | 7/2020 | Steedly et al. |
| 10,957,135 B2 | 3/2021 | McGehee |
| 11,127,195 B2 | 9/2021 | Yeoh et al. |
| 11,200,721 B2 | 12/2021 | Anderson et al. |
| 11,347,054 B2 | 5/2022 | Woods et al. |
| 11,379,034 B1 | 7/2022 | Wenger et al. |
| 2015/0029218 A1* | 1/2015 | Williams ........... G02B 27/0172 |
| | | 345/633 |
| 2018/0239144 A1 | 8/2018 | Woods et al. |
| 2018/0253141 A1* | 9/2018 | McCracken ....... G02B 27/0101 |
| 2019/0033961 A1 | 1/2019 | Croxford |
| 2019/0258058 A1 | 8/2019 | Fortin-Deschênes et al. |
| 2020/0098190 A1* | 3/2020 | Goergen .................. A63G 7/00 |
| 2020/0319463 A1* | 10/2020 | Nakamura .......... H04N 21/4318 |
| 2021/0343087 A1* | 11/2021 | Gomez Gonzalez ... G06F 3/013 |

OTHER PUBLICATIONS

Van Waveren J.M.P., "The Asynchronous Time Warp for Virtual Reality on Consumer Hardware," Nov. 1, 2016, pp. 37-46, https://dl.acm.org/doi/pdf/10.1145/2993369.2993375.

Krevelen, D. W. F. van, et al., A Survey of Augmented Reality Technologies, Applications and Limitations, The International Journal of Virtual Reality, Jan. 26, 2010, pp. 1-19.

Yadav, Hitesh, Wireless Data Transmission using Hand Gesture, Journal of Emerging Technologies and Innovative Research (JETIR), May 2018, pp. 404-415, vol. 5, Issue 5.

\* cited by examiner

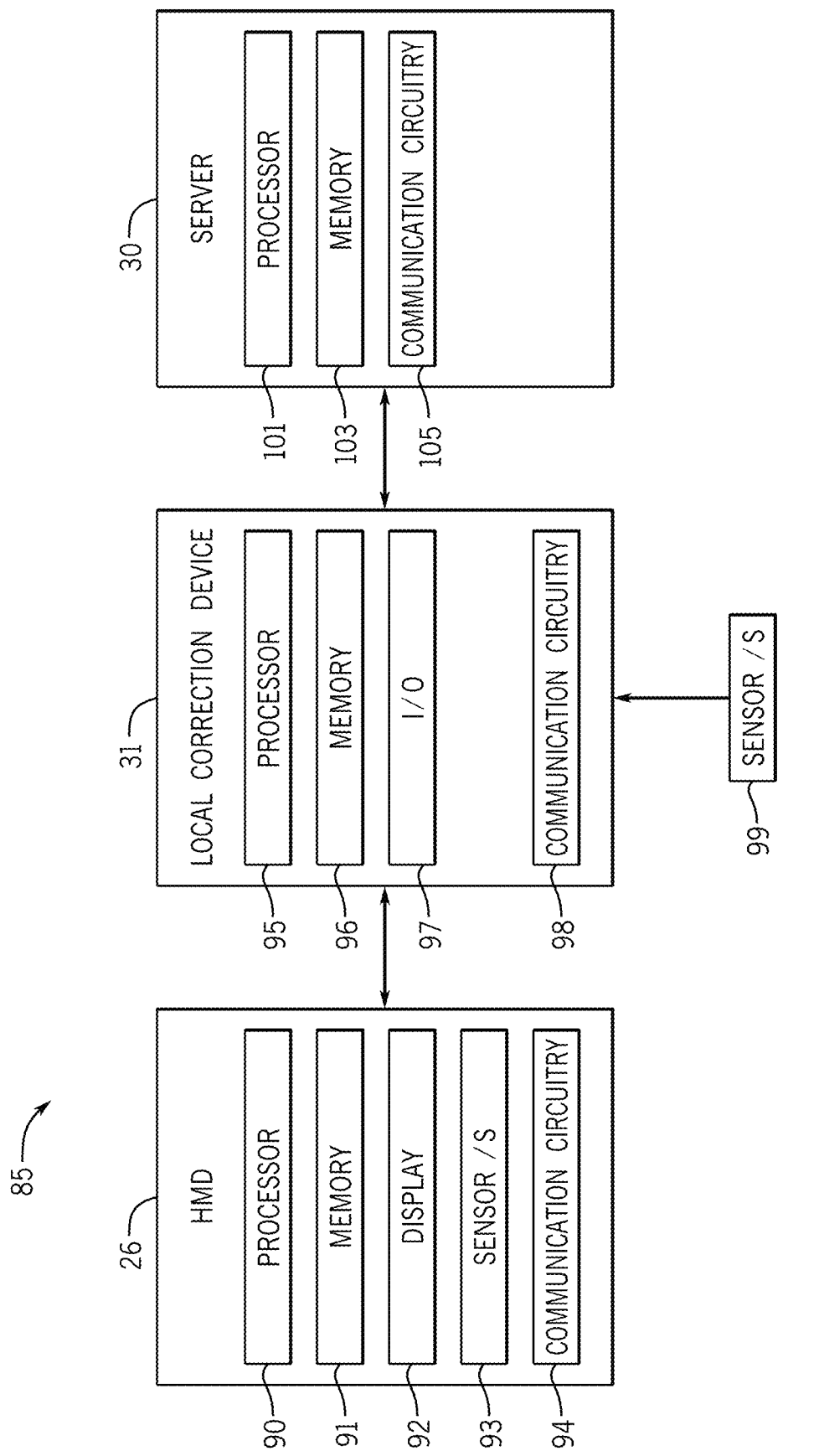

IMAGE CORRECTION SYSTEM AND METHOD

CROSS-REFERENCE TO RELATED APPLICATIONS

The present application claims priority to and the benefit of U.S. Provisional Application No. 63/538,980, entitled "IMAGE CORRECTION SYSTEM AND METHOD", filed on Sep. 18, 2023, the disclosure of which is hereby incorporated by reference in its entirety herein.

BACKGROUND

This section is intended to introduce the reader to various aspects of art that may be related to various aspects of the present disclosure. This discussion is believed to be helpful in providing the reader with background information to facilitate a better understanding of the various aspects of the present disclosure. Accordingly, it should be noted that these statements are to be read in this light and not as admissions of prior art.

The subject matter disclosed herein relates to amusement park attractions, and more specifically, to providing augmented or virtual experiences in amusement park attractions.

Amusement parks or theme parks may include various entertainment attractions useful in providing enjoyment to guests of the amusement parks. For example, the attractions may include a ride attraction (e.g., closed-loop track, dark ride, thriller ride, or other similar ride), and the attraction may be part of a themed environment that may be traditionally established using equipment, furniture, building layouts, props, decorations, displayed media, and so forth. These themed environments can also incorporate virtual reality (VR) or augmented reality (AR) systems. These AR or VR systems may include head-mounted displays (HMDs).

BRIEF DESCRIPTION

Certain embodiments commensurate in scope with the originally claimed subject matter are summarized below. These embodiments are not intended to limit the scope of the disclosure, but rather these embodiments are intended only to provide a brief summary of certain disclosed embodiments. Indeed, the present disclosure may encompass a variety of forms that may be similar to or different from the embodiments set forth below The present embodiments relate to a remote streaming client lens distortion system for an amusement park ride.

In accordance with an embodiment, an image correction system includes: a head-mounted display, a server, and a local correction device. The head-mounted display comprises: a display configured to display one or more corrected images and one or more sensors configured to generate tracking information over a period of time, the tracking information comprising initial tracking information and updated tracking information, wherein the initial tracking information is associated with a first time point and the updated tracking information is associated with a second time point subsequent to the first time point. The server is configured to generate one or more rendered images based at least in part on the initial tracking information. The local correction device is configured to: receive the tracking information from the head-mounted display, transmit the initial tracking information to the server, receive the one or more rendered images from the server, generate the one or more corrected images based on the one or more rendered images and the updated tracking information, and transmit the one or more corrected images to the head-mounted display.

In an embodiment, an image correction method includes steps of generating, at a server, one or more rendered images of an augmented reality/virtual reality (AR/VR) environment, wherein the one or more rendered images comprise at least one frame that is rendered based on tracking information; receiving, at a local correction device, the one or more rendered images; applying a first stage correction to the one or more rendered images, wherein the first stage correction is based on updated tracking information; applying a second stage correction to the one or more rendered images to generate one or more corrected images, wherein the second stage correction is a distortion correction associated with a head-mounted display; and transmitting the one or more corrected images to the head-mounted display.

In an embodiment, a non-transitory computer-readable medium includes processor-executable code that when executed by a processor, causes the processor to receive one or more rendered images of an augmented reality/virtual reality (AR/VR) environment, the one or more rendered images including at least one frame that is rendered based on tracking information; apply a first stage correction to the one or more rendered images, the first stage correction based on updated tracking information; apply a second stage correction to the one or more rendered images to generate one or more corrected images, the second stage correction being distortion correction associated with a head-mounted display; and transmit the one or more corrected images to the head-mounted display.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein:

FIG. 8 is a block diagram of an image correction system including a head-mounted display, a local correction device, and a server, in accordance with present techniques.

DETAILED DESCRIPTION

Figure 1:
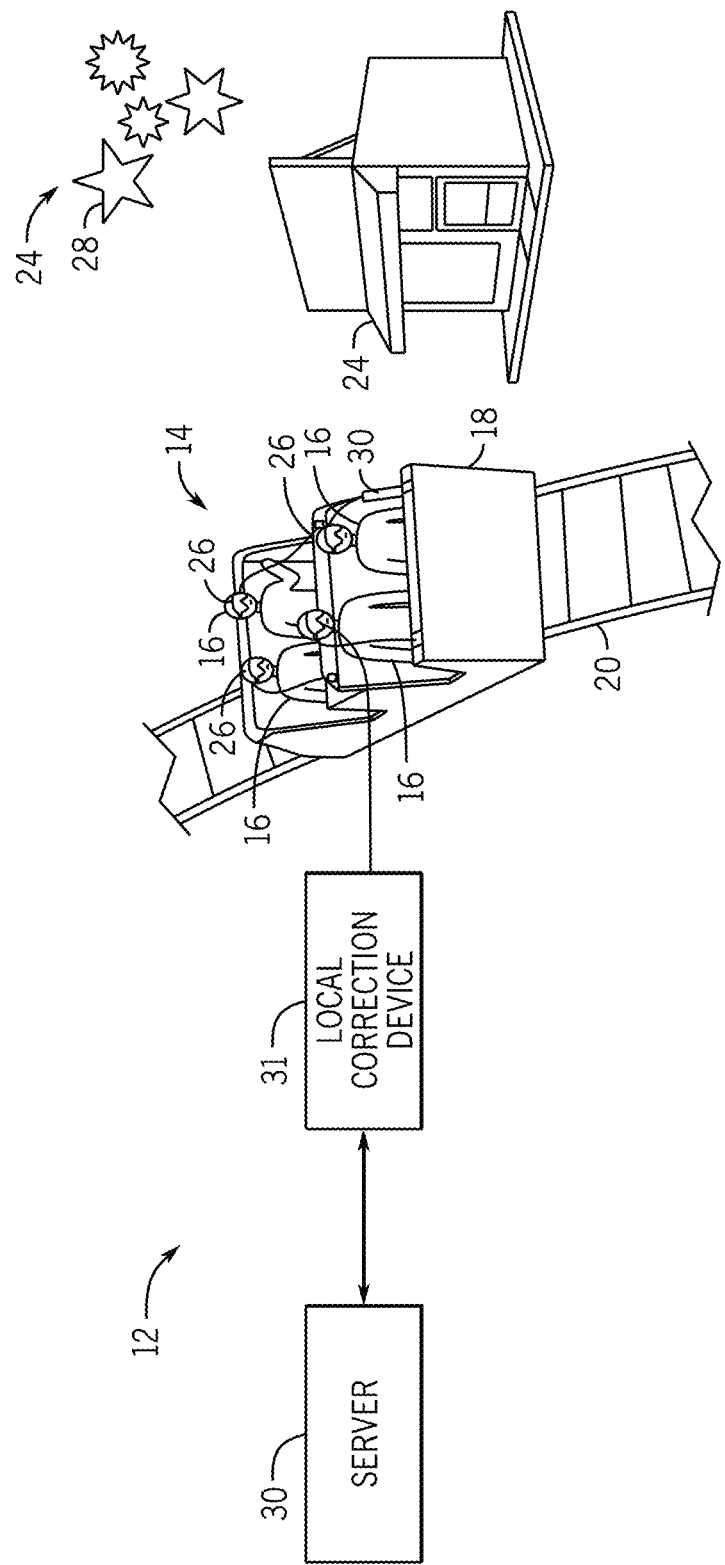
FIG. 1 is a schematic illustration of an embodiment of an image correction system of an amusement park ride, in accordance with present techniques.

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements.

An amusement park may include an augmented reality (AR), a virtual reality (VR), and/or a mixed reality (a combination of AR and VR) system (e.g., AR/VR system) to enhance a guest experience of an amusement park attraction by providing guests with AR/VR experiences (e.g., AR experiences, VR experiences, or both). For example, the AR/VR system may include a head-mounted display (e.g., electronic goggles or displays, eyeglasses), which may be worn by a guest to enable the guest to view virtual or augmented reality features. In particular, the head-mounted display may be utilized to enhance a guest experience by overlaying virtual features onto a real-world environment of the amusement park, by providing adjustable virtual environments to provide different experiences in an attraction, and so forth.

Providing an immersive AR/VR experience can be challenging. For example, overlaid AR images are more realistic when these images remain fixed relative to coordinates of the environment even when the guest turns or moves. Thus, shifts in guest position can be provided as an input to the system, and the display characteristics of the AR/VR images can be at least in part updated based on these position shifts. However, any lag or latency between changes in guest position and the calculated and transmitted change in the displayed environment can compromise the level of immersion and believability that an AR/VR system is able to provide. Further, excessive latency in such a system may induce motion sickness or other forms of discomfort for guests. Updates to an AR/VR environment, while often computationally intensive, should thus be completed expeditiously and displayed smoothly to ensure comfort and enjoyment for guests.

The disclosed embodiments provide an image correction system that may be implemented as a part of or in conjunction with an AR/VR experience of an amusement park attraction. The image correction system may include a distributed image correction technique in which a separate or remote server generates AR/VR images and sends these AR/VR images to a local correction device. The local correction device receives updated tracking or position information for a guest of a head-mounted device and applies a final correction to the AR/VR images before sending the correct AR/VR images to the head-mounted device. In an embodiment, guest tracking information is sent to the server to generate the AR/VR images. The local correction device, which receives these images, can then use updated or subsequent tracking information to apply the final correction or corrections. Thus, the AR/VR images are corrected using different, and updated, tracking information rather than the slightly older tracking information that is used to generate the AR/VR images. This permits the final corrections to be more accurate and realistic and reduces a sensation of lagging.

Further, the image correction system benefits from the modularization of its subsystems. Modular correction provides benefit of permitting technology upgrades or changes without changing the entire correction logic. In an embodiment, correction factors specific to a particular hardware element, such as the head-mounted display, can be localized to the appropriate local correction device as a separate algorithm or modular correction. Accordingly, upgrading the head-mounted display to a different version or manufacturer can cause distribution of the upgraded correction factor to only the relevant local correction devices associated with the upgraded head-mounted displays. In this manner, new devices can be mixed in with older versions while maintaining appropriate correction factors where relevant and without changing global operating parameters. In one example, the correction factor is a lens distortion correction associated with a particular lens arrangement of a head-mounted display. Delegation of rendering duties between the head-mounted device, local correction device, and server allow changes in the rendering process to be made at one component without the capabilities of another being affected. Additionally, the combination of a plurality of sensors allows for more accurate and fault-tolerant generation of tracking information.

While certain embodiments of the disclosure are discussed in the context of head-mounted devices worn by a guest, it should be understood that the disclosed image correction techniques may also be used in conjunction with projection mapping or other image display techniques associated with tracked movement. The method of one or more image corrections used in the image correction system may depend on the nature of the display technique that is implemented.

It should also be understood that the images to be generated, corrected, and displayed may comprise data that is transmitted continuously (i.e. streamed) between devices comprising the image correction system. The data transmission is herein discussed in the context of a single image, but these images may be continuously transmitted as video data or data of other sizes or forms (e.g. datasets, packets, and so forth), and the transmitted data may represent only a subset of the data used for the entirety of the ride experience. The images represented by the data may also be referred to in the context of AR/VR graphics generation as frames, and the terms may herein be used interchangeably.

FIG. 1 is a representation of an image correction system 12 for an amusement ride 14. The image correction system includes a local correction device 31, head-mounted displays 26, and a server 30. The local correction device 31 may be communicatively coupled to the head-mounted display 26 via wired (e.g. HDMI, USB, etc.) or wireless connection, and communicatively coupled to a server 30 through wired or wireless connection.

The amusement ride 14 includes a ride vehicle 18 that travels along a ride path 20 causing the ride vehicle 18 to move along a ride path and, in some cases, according to a particular motion pattern caused by vehicle motion or vehicle effects. As shown in FIG. 1, guests 16 are positioned or seated within the ride vehicle 18 and each guest 16 has an associated head-mounted display 26 that displays images and, in embodiments, may provide accompanying audio content to enhance the attraction experience. The head-mounted displays may be configured for one or both of AR or VR content. In an AR implementation, at least at certain times of the ride, the guests 16 may be able to view physical structures in the real-world environment 24 through the screens of the head-mounted displays 26 as well as displayed virtual features 28. The head-mounted displays may, additionally or alternatively, be used in a fully immersive VR configuration in which the guests 16 view the displayed images on the head-mounted displays 26 in an immersive manner and cannot view the real-world environment through the lenses of the head-mounted display 26. However, it should be understood that the displayed images may include images of the physical structures that are captured by cameras and, in turn provided as displayed images on the head-mounted displays 26. Each guest 16 may be presented with different virtual features 28 so that each guest 16 has a different experience on the ride 14 in an embodiment.

To provide an improved immersive experience via the head-mounted displays 26, media content, such as still images and/or streaming video, can be rendered based on data indicative of the position and orientation of a particular guest 16. Further, these rendered images can be corrected or adjusted based on real-time changes to the guest position. Accordingly, as the guest moves or reacts to the real-world environment, the media content sent from a server 30 can be corrected using a local correction device 31 that takes in guest position information as an input factor for correction.

Figure 2:
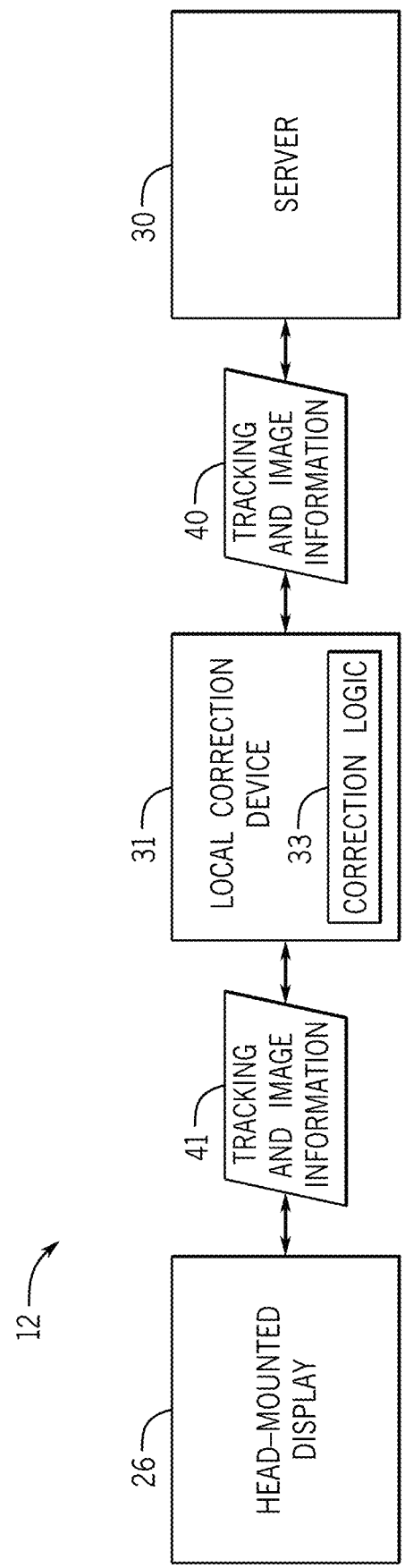
FIG. 2 is a flow diagram of communication between devices of an image correction system, in accordance with present techniques.

As shown in FIG. 2, the image correction system 12 includes a local correction device 31, head-mounted displays 26, and a server 30. The local correction device 31 is communicatively coupled to the head-mounted display 26 via wired (e.g. HDMI, USB, etc.) or wireless connection, and communicatively coupled to a server 30 through wired or wireless connection. The local correction device 31 may transmit tracking information 40 to the server 30. The server 30 uses the tracking information 40 to generate one or more rendered images and transmit them to the local correction device 31. The local correction device 31 uses embedded correction logic 33 and tracking information 41 to correct the one or more rendered images and transmit the corrected images 41 to the head-mounted display 26.

In certain AR/VR streaming arrangements, sensors may transmit tracking information to a server via streaming client, images may be rendered and corrected at the server based on that tracking information, and the images may be streamed to a client connected to a head-mounted display. In these arrangements, the server generates rendered images based only on initial tracking information, limiting the post-processing effectiveness if the guest has moved since the tracking information was collected. This difference in the image correction and subsequent minor movement of the head or orientation of the guest may contribute to feelings of lag, which decrease the immersiveness of the experience.

Figure 3:
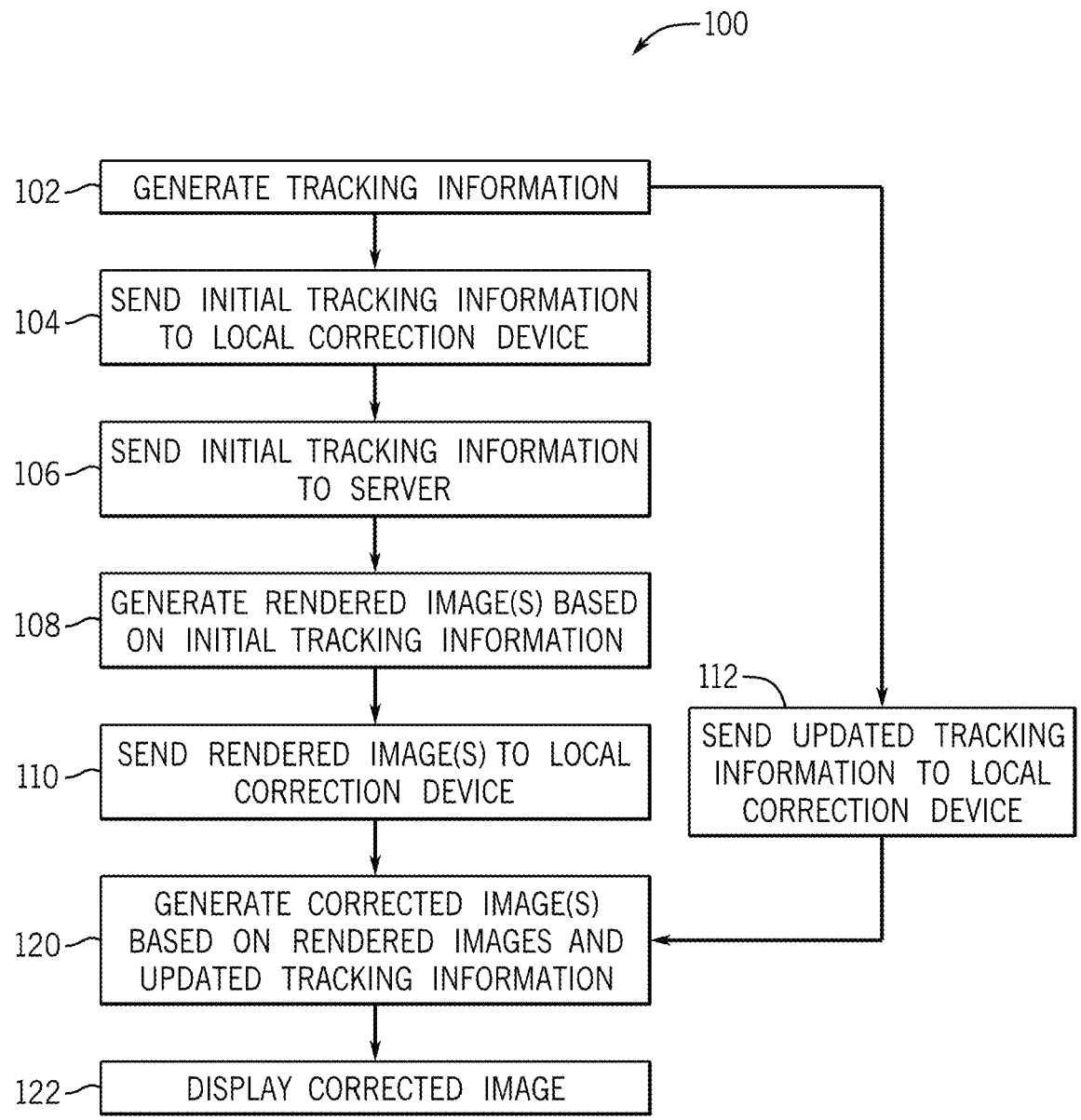
FIG. 3 is a flow diagram of an image correction method in accordance with present techniques.

FIG. 3 is a flow diagram of a method 100 for correcting images in an AR/VR system using a local correction device and is discussed with references to features of FIG. 1-2. The process begins with generating initial tracking information (block 102) indicative of guest position and/or orientation or position and/or orientation of the head-mounted device 26. For example, the tracking information may be generated using one or more sensors on-board the head-mounted display 26. Additionally or alternatively, the tracking information may be generated by environmental sensors of the attraction, such as sensors of the ride vehicle 18. The initial tracking information is then sent to the local correction device 31 (block 104) and subsequently the server 30 (block 106). When the server 30 receives the initial tracking information, it generates rendered images (block 108) based at least in part on the initial tracking information and sends the generated images 40 to the local correction device 31 (block 110). At a time point subsequent to generation of initial tracking information 41, updated tracking information is generated of the head-mounted display 26 and sent to the local correction device 31 (block 112). The local correction device 31 uses the updated tracking information and received images to apply one or more corrections to the received images (block 120). These corrected images are then sent to the head-mounted display 26 and displayed to the guest (block 122).

Figure 4:
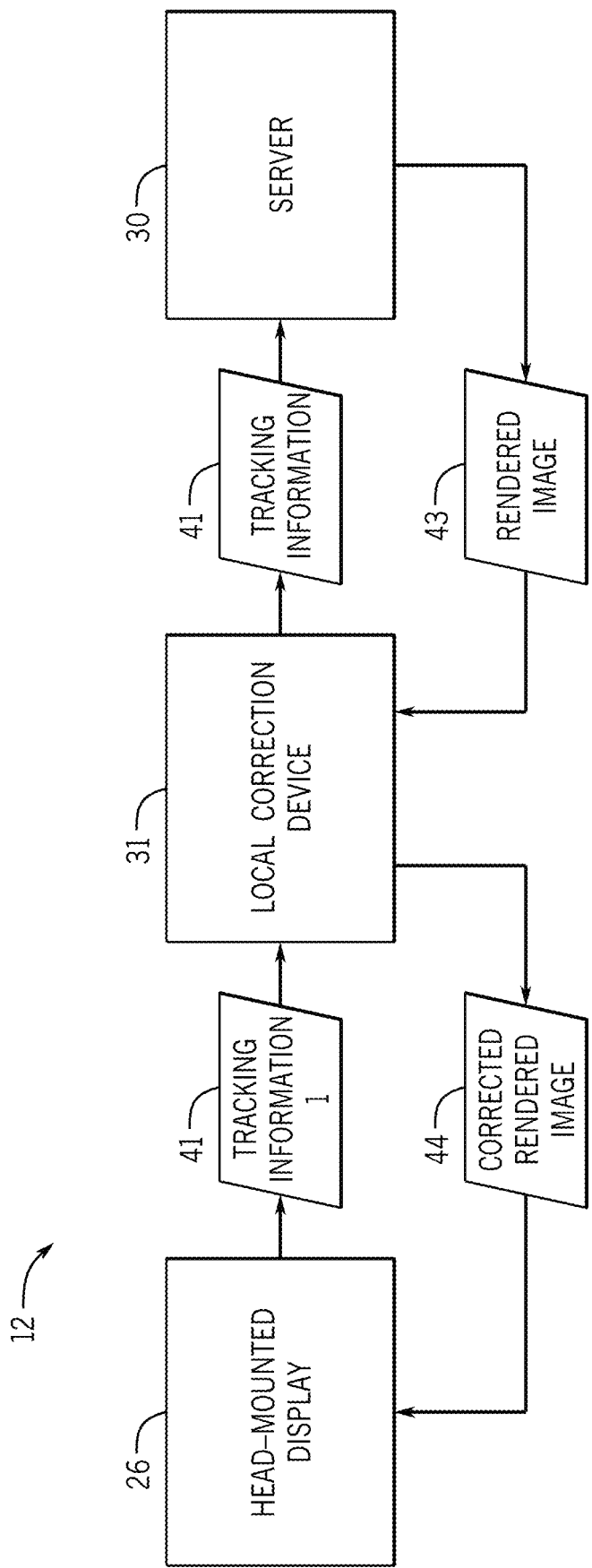
FIG. 4 is a schematic illustration of communication between hardware components of the embodiment of FIG. 2, in accordance with present techniques.

FIG. 4 shows communication pathways of the image correction system 12 between the display device (e.g., a head-mounted display 26), the local correction device 31, and the server 30. In the illustrated example, the guest tracking information 41 is generated directly from the head-mounted display 26 using on-board sensors and/or is passed through the head-mounted display 26 from those sensors. However, in embodiments, the tracking information 41 may be communicated to the local correction device 31 from other sensors. The local correction device 31 may pass along the tracking information 41 to the server 30, which in turn uses the tracking information to generated one or more rendered images 43 that are sent to the local correction device 31. The local correction device 31 applies local corrections using updated tracking information 41 from a subsequent time point to generate one or more corrected rendered images 44 that are transmitted to the head-mounted display 26.

In embodiments, the communication between the local correction device 31 and the server is wired or wireless. The local correction device 31 may be local to the attraction or the ride vehicle 18.

The local correction device 31 may be configured to apply a correction algorithm to compensate for artifacts generated as byproducts of earlier corrections. For example, spacewarp or timewarp corrections shift displayed objects within an image based on tracking information 41 supplied by sensors. This shift may cause occluded parts of the environment to be revealed as part of the corrected image. These previously occluded elements of the image may appear as "blank" areas in the corrected image, compromising believability of the virtual environment and thus immersion for a guest. An algorithm implemented as a correction by the local correction device 31 may identify areas that are artifacts of prior corrections and use patterns from the surrounding regions of image to "fill in" the blank area. The correction may be accomplished using artificial intelligence (AI) algorithms or other means. In another embodiment, this correction may be completed by the head-mounted display 26 before an image is displayed.

In addition to the correction of rendered images 43 and storage of tracking information 41, the local correction device 31 may assume other duties in the rendering pipeline. These capabilities may include overlay generation and updates associated with a guest-specific profile. For example, a guest profile associated with a particular guest 16 may include information about their score, health points, and ammunition that is generated during game play of an attraction and provided by the server 30. In an embodiment, the local correction device 31 may provide a hub for storing and updating the values the guest's score, health points, and ammunition, as well as creating an overlay displaying that information on a generated image such that the overlay is provided onto the corrected rendered image 44. This overlay may be added to or superimposed on the corrected rendered image 44 after the local correction device 31 applies corrections to the rendered image 43 received from the server. In another embodiment, this overlay is rendered by the server 30 as part of the rendered image 43.

In some embodiments, the head-mounted display 26 is configured to be worn on the head of a guest 16 and includes one or more sensors, the one or more sensors including a hand-tracking camera used to generate tracking information based at least on part on the position of the guest's hands. The image correction system may use a combination of tracking information and images displayed by the head-mounted display to determine that the guest 16 is interacting with the virtual environment. This interaction may effect a subsequent change in the virtual environment (e.g. an animation, special effect, movement). For example, tracking information may include an indication that a guest is pointing up and to the left. The image correction system references the images displayed to the head-mounted display 26 to determine that the guest 16 is pointing at a star object at the top left of the virtual environment. The image correction system then generates images that show the star bursting and displays the images to the guest, allowing guests to see the virtual implications of their hand movements.

In an embodiment, at least one of the one or more sensors of the head-mounted 26 display include an inertial measurement unit (IMU). The IMU is configured to generate tracking information 41 based at least in part on the position of a guest head. The tracking information associated with the guest's head (i.e. motion data or orientation data) comprises at least three values corresponding to the three axes on which a guest's head may move. This tracking information is sent to the local correction device where it is sent to the server or stored in memory.

In an embodiment, the server 30 is responsible for rendering any imagery of the guest's hands and their interactions with the virtual environment. Tracking information from the hand-tracking camera embedded in or connected to the head-mounted display 26 is sent to the server 30 via the local correction device 31. The server 30 receives the tracking information 41 and generates a rendered image 43 including using tracking information from the hand-tracking camera.

Similarly, the server 30 may be responsible for generating certain other elements of the virtual environment the guest 16 interacts with. These elements may include objects within a virtual environment that are to be displayed by at least one of the head-mounted displays 26 serviced via the local correction device 31. For example, as illustrated in FIG. 1, virtual objects 28 can be associated with particular locations in an attraction for all guests 16 in the ride vehicle 18. The server generates the object 28 as part of every rendered image 43 for all local correction devices 31 and head-mounted displays 26. This implementation uses the presumption that guests 16 experiencing the same AR/VR amusement park ride will be interacting with similar virtual environments, and those similar virtual environments often share common virtual objects.

This delegation of rendering duties (i.e. multi-layer rendering) leads to improved modularity for maintenance functions of the amusement park ride system. If a change to one or more rendering aspects of an AR/VR amusement park is performed, separate maintenance functions are available based on whether that part of the rendering process happens at the server level or at the local correction device. For example, to change the starting ammunition value for a ride profile, an operator may change the local correction device's maintenance functions without changing the functions associated with the server 31. Similarly, to change the color of a virtual object, if the server is responsible for generating that object, the operator may use the server's maintenance functions without affecting the local correction device's functions. Changes to a rendering system in which its parts are segregated as described have a smaller footprint, leading to a lessened likelihood that changes to one part of the system create faults at other parts of the system.

Likewise, the correction logic used to adjust images after generation is modularized such that changes can be made to one stage or aspect of correction without changing others. For example, if a change in distortion is implemented to accommodate a larger head-mounted device, the system can remain functional without changing other late-latch warping effects.

Figure 5:
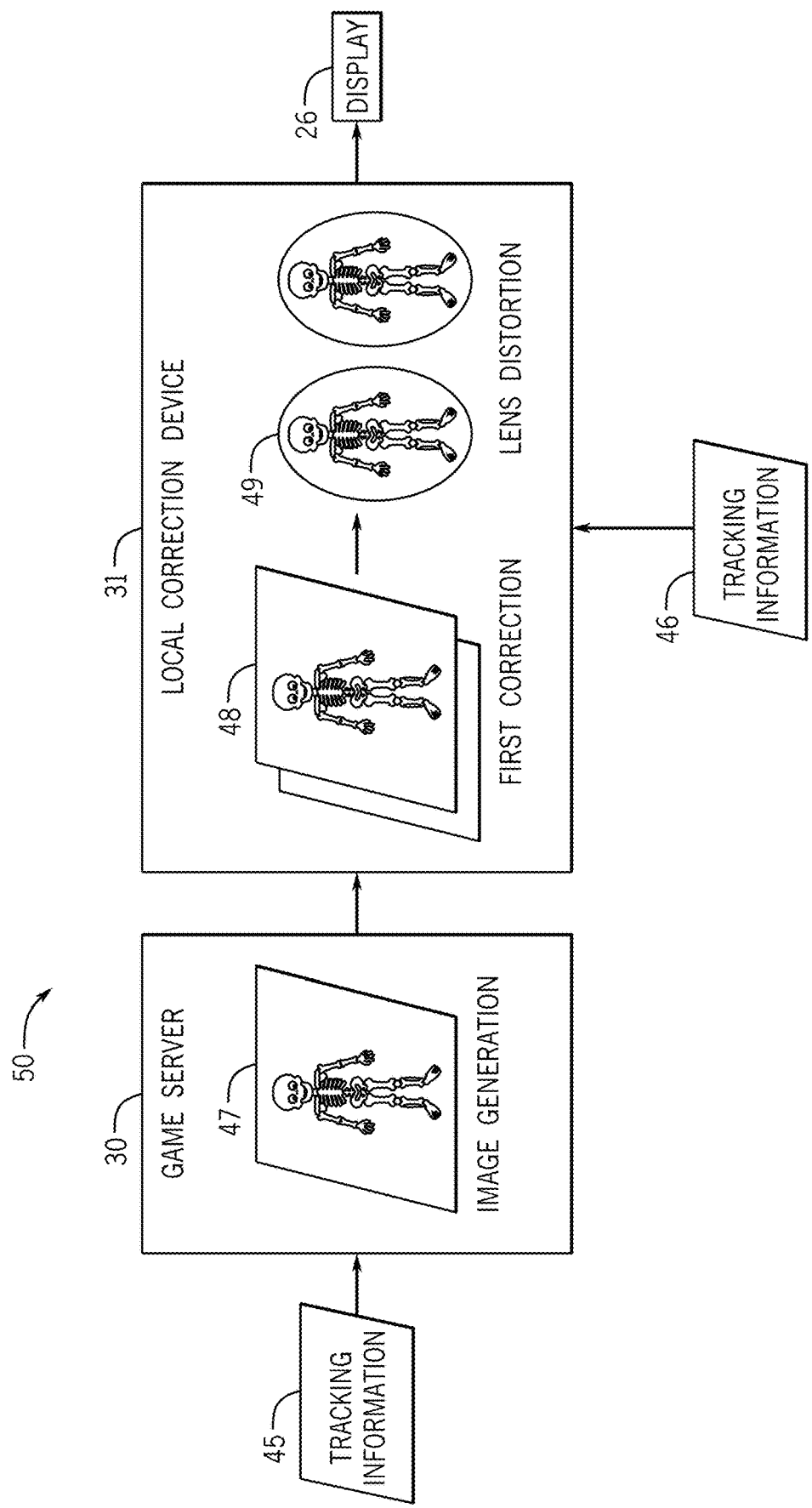
FIG. 5 is a schematic illustration of generating and correcting an image of an image correction system, in accordance with present techniques.

FIG. 5 is a schematic illustration of an image correction pathway 50 for using tracking information and the local correction device 31 to generate and correct an image. The server 30 receives tracking information 45 and generates a frame 47 based at least in part on the tracking information 45. The local correction device 31 receives the generated frame 47 and applies two corrections to the generated frame, at least one of the corrections being a lens distortion correction, to create a warped frame 48 and, subsequently, a distorted frame 49. Once the image correction pathway 50 has generated a frame and applied corrections, the frame is ready to be transmitted to the head-mounted display 26.

The latency of AR/VR image generation and correction methods (i.e. "render pipelines") are often dependent on the effectiveness of latency-combating, post-processing techniques. After the initial steps in the render pipeline (e.g. vertex processing, rasterization, fragment processing, etc.), post-processing corrections may be introduced. These post-processing effects include "late-latch" effects, such as asynchronous reprojection (i.e. "spacewarp" and "timewarp"). These late-latch effects use a combination of previously rendered images and newer motion data from tracking sensors to warp the previous frame into a prediction of what a frame to be rendered may look like. Post-processing techniques also include distortion, in which an image is distorted to fit the distortion of a display environment. Post-processing techniques are most effective when they use the newest possible motion input from the head-mounted display to alter the image. It is thus beneficial to delay post-processing at least until updated tracking or position information becomes available. With the foregoing in mind, the system of FIG. 5 allows the local correction device 31 to implement post-processing corrections with updated tracking information 46.

In an embodiment, the local correction device may be configured to send only some elements of the initial tracking data it receives to the server, and store other elements in memory. For example, if the server 30 only uses initial camera data for image generation, but the initial tracking data includes camera data and inertial measurement unit (IMU) data, the local correction device may be configured to select only the camera data to be sent to the server. The IMU data may be stored by the local correction device in memory and may be used as input for image correction logic at a later time.

Figure 6:
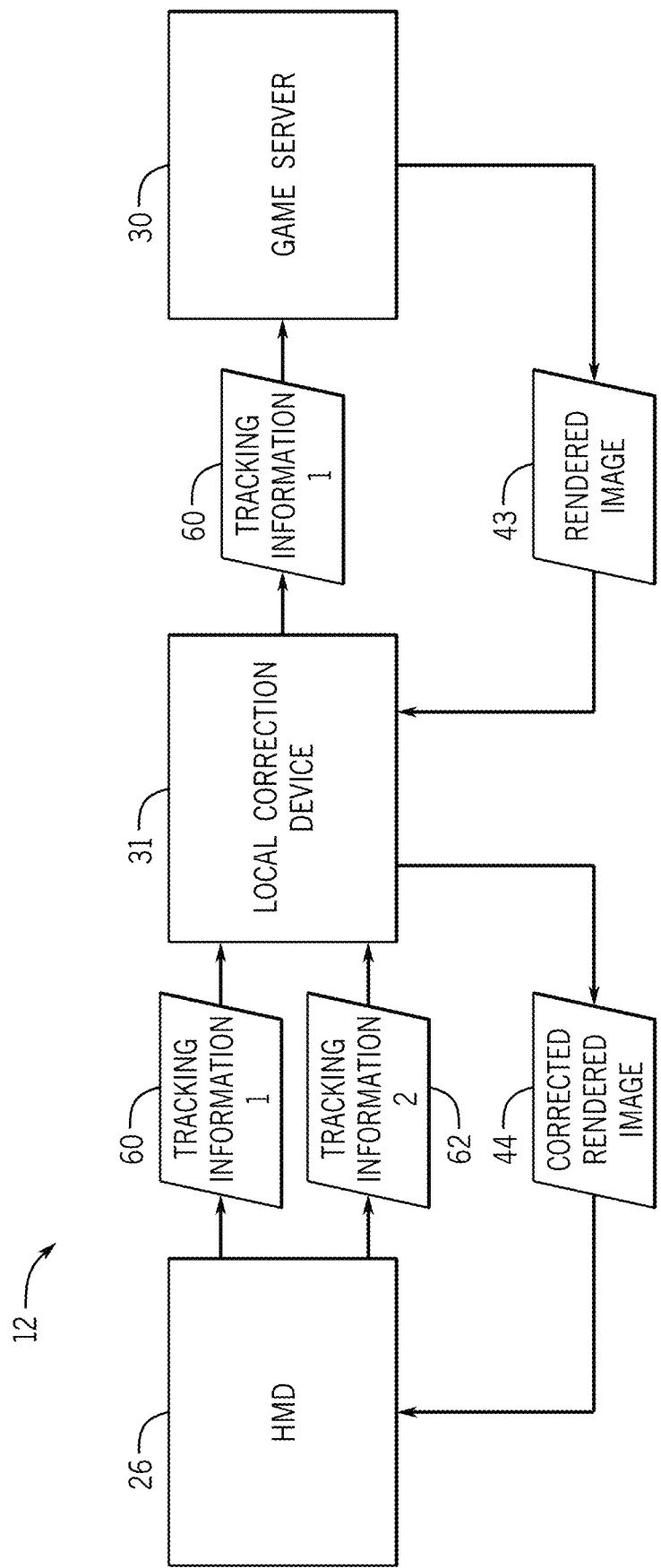
FIG. 6 is a schematic illustration of communicating sets of tracking information of the embodiment of FIG. 2, in accordance with present techniques.

FIG. 6 is a schematic illustration of communication pathways of the image correction system 12 wherein the local correction device 31 selects tracking information to be sent to the server 30. Sensors that comprise the head-mounted display 26 generate two sets of tracking information, Tracking Information 1 60 and Tracking Information 2 62, and send both sets to the local correction device 31. The local correction device 31 is configured to determine that only Tracking Information 60 should be sent to the server 30. Accordingly, Tracking Information 60 is sent to the server 30, while Tracking Information 62 is stored in memory.

The local correction device 31 may be configured to process tracking information it receives from the head-mounted display 26 and send that processed information to the server. Processing of the data by the local correction device 31 may be beneficial to the operation of the local correction device 31, the server 30, or the image correction system 12. For example, a processed tracking information set may be smaller than the pre-processed tracking information set. Reducing the size of the data to be sent may lead to faster transmission of data over a streaming connection, leading to less cumulative latency experienced by a guest.

Figure 7:
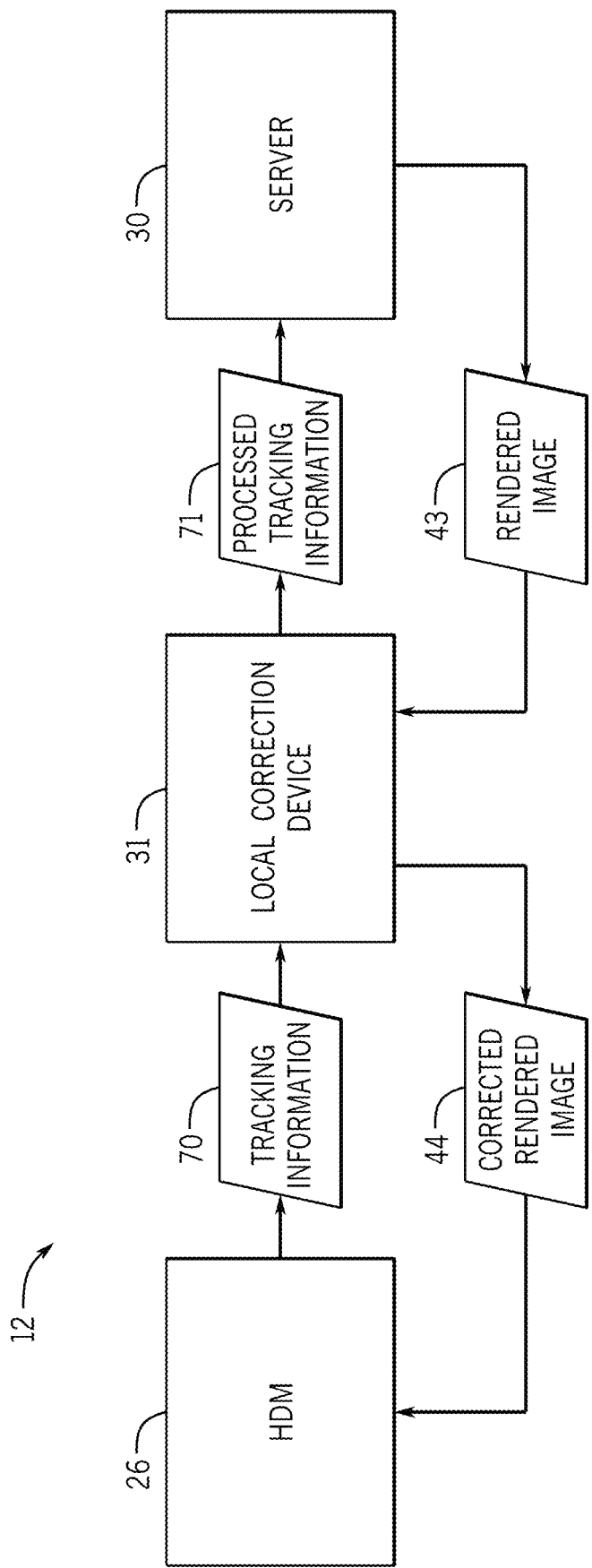
FIG. 7 is a schematic illustration of communicating tracking information of the embodiment of FIG. 2, in accordance with present techniques.

FIG. 7 shows an image correction system 12 wherein only processed data 71 is sent from the local correction device 31 to the server 30. The local correction device 31 receives a tracking information set 70 from the head-mounted display 26, processes the tracking information set, and sends the processed tracking information set 71 to the server 30. The server 30 is configured to use the processes tracking information 71 to generate a rendered image 43 and send it to the local correction device 31. The local correction device 31 then uses correction logic to generate corrected rendered image 44 and send it to the head-mounted display.

FIG. 8 is a block diagram of the image correction system 85 that incorporates the head-mounted display 26, the local correction device 31, one or more auxiliary or environmental sensors 99, and the server 30, in accordance with present embodiments.

The head-mounted display 31 may include one or more processor(s) 90 and one or more memory device(s) 91. In some embodiments, the processor(s) 90 and the memory device(s) 91 may be external to the head-mounted display 26. The one or more processor(s) 90 may execute software programs and/or instructions to display images to the display 92. Moreover, the processor(s) 90 may include multiple microprocessors, one or more "general-purpose" microprocessors, one or more special-purpose microprocessors, and/or one or more application specific integrated circuits (ASICS), and/or one or more reduced instruction set (RISC) processors. The memory device(s) 91 may include one or more storage devices, and may store machine-readable and/or processor-executable instructions (e.g., firmware or software) for the processor(s) 90 to execute, such as instructions relating to adjusting display of a virtual object. As such, the memory device(s) 91 may store, for example, control software, look up tables, configuration data, and so forth, to facilitate adjusting display of a virtual object. In some embodiments, the processor(s) 90 and the memory device(s) 91 may be external to the head-mounted display 26. The memory device(s) 91 may include a tangible, non-transitory, machine-readable-medium, such as a volatile memory (e.g., a random access memory (RAM)) and/or a nonvolatile memory (e.g., a read-only memory (ROM), flash memory, hard drive, and/or any other suitable optical, magnetic, or solid-state storage medium). Additionally, the head-mounted display 26 may include one or more sensors 93 (e.g. hand-tracking sensors, eye-tracking sensors, inertial measurement units, microphones, and the like).

The local correction device 31 receives tracking information from the head-mounted display 26 and rendered images 43 from the server 30. The local correction device 31 includes processor(s) 95, memory device(s) 96, an input/output (I/O) port 97, and communication circuitry 98. The I/O port 97 may receive tracking information from the head-mounted display 26 or generated images from the server 30. The processor(s) 95 may execute software programs to reduce the size of or enhance the tracking information. The processor(s) 95 may also execute software programs and/or instructions to adjust the images, such as virtual features, displayed on the head-mounted display 26. The memory device(s) 96 may include one or more storage devices and may store machine-readable and/or processor-executable instructions (e.g., firmware or software) for the processor(s) 95 to execute, such as instructions relating to adjusting images based on tracking information. The communication circuitry 98 facilitates wireless (e.g. ethernet, WAN, and the like) and/or wired (HDMI, USB, and so forth) communication with the head-mounted display 26 and server 30.

The server 30 may include one or more processor(s) 101, one or more memory device(s) 103, and communication circuitry 105. The processor(s) 101 may execute software programs to generate rendered images based at least in part on received tracking information. The memory device(s) 103 may include one or more storage devices and may store machine-readable and/or processor-executable instructions (e.g., firmware or software) for the processor(s) 101 to execute, such as instructions relating to AR/VR amusement ride logic and updates. The communication circuitry 105 facilitates a wireless streaming connection with the local correction device 31 or, in embodiments, a wired connection.

While only certain features of the invention have been illustrated and described herein, many modifications and changes will occur to those skilled in the art. It is, therefore, to be understood that the appended claims are intended to cover all such modifications and changes as fall within the true spirit of the invention.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform] ing [a function] . . . " or "step for [perform] ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. An image correction system, comprising:
    a head-mounted display comprising:
        a display configured to display one or more corrected images; and
        one or more sensors configured to generate tracking information over a period of time, the tracking information comprising initial tracking information and updated tracking information, wherein the initial tracking information is associated with a first time point and the updated tracking information is associated with a second time point subsequent to the first time point;
    a server configured to generate one or more rendered images based at least in part on the initial tracking information; and
    a local correction device configured to:
        receive the tracking information from the head-mounted display;
        transmit the initial tracking information to the server;

receive the one or more rendered images from the server;
generate one or more corrected images based on the one or more rendered images and the updated tracking information; and
transmit the one or more corrected images to the head-mounted display, wherein the local correction device and the head-mounted display are positioned on or in a ride vehicle, and wherein the local correction device is coupled to at least one additional head-mounted display of the ride vehicle.

2. The image correction system of claim 1, wherein the local correction device is configured to generate the one or more corrected images by correcting for lens distortion associated with the head-mounted display.

3. The image correction system of claim 2, wherein the local correction device is configured to generate the one or more corrected images by applying one or more of timewarp, spacewarp, lens distortion factor corrections, or late latch corrections.

4. The image correction system of claim 3, wherein correcting for the lens distortion factor occurs subsequent to applying the one or more of timewarp, spacewarp, or late latch corrections.

5. The image correction system of claim 1, wherein the local correction device is affixed to or embedded in a housing of the head-mounted display.

6. The image correction system of claim 1, wherein the local correction device is wirelessly coupled to the server.

7. The image correction system of claim 6, wherein the local correction device is coupled to the head-mounted display via a wired connection.

8. The image correction system of claim 1, wherein the local correction device transmits one or more corrected images to no more than one head-mounted display.

9. The image correction system of claim 1, wherein the one or more sensors comprise at least a camera and an inertial measurement unit (IMU) that generate tracking information.

10. The image correction system of claim 9, wherein the tracking information generated by the camera is communicated to the local correction device and subsequently the server, and the tracking information generated by the IMU is communicated to the local correction device and not the server.

11. An image correction method, comprising:
generating, at a server, one or more rendered images of an augmented reality/virtual reality (AR/VR) environment, wherein the one or more rendered images comprise at least one frame that is rendered based on tracking information;
receiving, at a local correction device, the one or more rendered images;
applying a first stage correction to the one or more rendered images at the local correction device, wherein the first stage correction is based on updated tracking information;
applying a second stage correction to the one or more rendered images to generate one or more corrected images, wherein the second stage correction is a distortion correction associated with a lens of a head-mounted display; and
transmitting the one or more corrected images to the head-mounted display, wherein the local correction device and the head-mounted display are positioned on or in a ride vehicle, and wherein the local correction device is coupled to at least one additional head-mounted display of the ride vehicle.

12. The image correction method of claim 11, wherein the head-mounted display comprises a projector, and the distortion correction is a function of distortions of display surfaces on which a projected image will be displayed.

13. The image correction method of claim 11, wherein the local correction device or the head-mounted display is configured to apply a third stage correction to the one or more rendered images.

14. The image correction method of claim 11, wherein the tracking information is generated at the head-mounted display and communicated to the server via the local correction device.

15. The image correction method of claim 11, wherein the updated tracking information is generated at the head-mounted display and communicated to the local correction device and not to the server.

16. A non-transitory computer-readable medium, the computer-readable medium comprising processor-executable code that when executed by a processor, causes the processor to:
receive one or more rendered images of an augmented reality/virtual reality (AR/VR) environment, wherein the one or more rendered images comprise at least one frame that is rendered based on tracking information;
apply a first stage correction to the one or more rendered images, wherein the first stage correction is based on updated tracking information;
apply a second stage correction to the one or more rendered images to generate one or more corrected images, wherein the second stage correction is a distortion correction associated with a head-mounted display; and
transmit the one or more corrected images to the head-mounted display, wherein the first stage correction is applied by a local correction device, and wherein the head-mounted display and the local correction device are positioned on or in a ride vehicle and wherein the local correction device is coupled to at least one additional head-mounted display of the ride vehicle.

17. The non-transitory computer-readable medium of claim 16, wherein the processor-executable code, when executed by the processor, causes the processor to:
receive the tracking information from the head-mounted display; and
transmit the tracking information to a server configured to generate the one or more rendered images of the AR/VR environment.

18. The non-transitory computer-readable medium of claim 16, wherein the distortion correction is one or more of timewarp, spacewarp, lens distortion factor corrections, or late latch corrections.

* * * * *